(12) United States Patent
Eckel et al.

(10) Patent No.: US 6,713,544 B2
(45) Date of Patent: Mar. 30, 2004

(54) FLAME-RESISTANT AND HEAT-RESISTANT POLYCARBONATE COMPOSITIONS

(75) Inventors: Thomas Eckel, Dormagen (DE); Andreas Seidel, Dormagen (DE); Dieter Wittmann, Leverkusen (DE); Uwe Peucker, Coelbe (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/006,517

(22) Filed: Dec. 3, 2001

(65) Prior Publication Data

US 2002/0128359 A1 Sep. 12, 2002

(30) Foreign Application Priority Data

Dec. 8, 2000 (DE) .......................... 100 61 078

(51) Int. Cl.[7] ................................ C08K 5/52
(52) U.S. Cl. ........................ 524/127; 524/145
(58) Field of Search ................. 524/127, 145

(56) References Cited

U.S. PATENT DOCUMENTS

| | | | |
|---|---|---|---|
| 5,061,745 A | 10/1991 | Wittmann et al. | 524/139 |
| 5,204,394 A | 4/1993 | Gosens et al. | 524/125 |
| 5,672,645 A | 9/1997 | Eckel et al. | 524/127 |
| RE36,188 E | 4/1999 | Gosens et al. | 524/125 |
| RE36,902 E | 10/2000 | Eckel et al. | 524/127 |

FOREIGN PATENT DOCUMENTS

| | | |
|---|---|---|
| CA | 2300218 | 2/1999 |
| DE | 19914139 | 9/2000 |
| EP | 0 747 424 | 12/1996 |
| EP | 0 936 244 | 8/1999 |
| WO | 96/11977 | 4/1996 |
| WO | 00/58402 | 10/2000 |

*Primary Examiner*—Kriellion A. Sanders
(74) *Attorney, Agent, or Firm*—Joseph C. Gil; Aron Preis

(57) ABSTRACT

Compositions containing:
  I. at least two components selected from the group comprising aromatic poly(ester) carbonates, graft polymers of one or more vinyl monomers on one or more graft bases having a glass transition temperature of <10° C., a thermoplastic vinyl (co)polymer, or poly(alkylene terephthalate) as well as
  II. 0.5 to 25 parts by weight of a mixture of phosphorus compounds of the general formula (I)

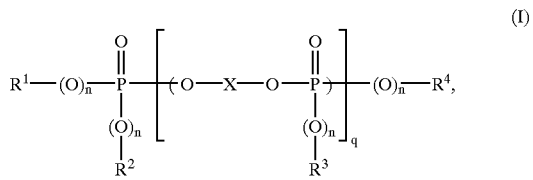

with the proviso that the composition contains at least 2 phosphorus compounds of the formula (I) in which X or one or more radicals $R^1$, $R^2$, $R^3$ and $R^4$ is/are different and wherein the sum of the parts by weight of the components is 100.

13 Claims, No Drawings

FLAME-RESISTANT AND HEAT-RESISTANT POLYCARBONATE COMPOSITIONS

FIELD OF THE INVENTION

The present invention relates to polycarbonate compositions that have been rendered flame-resistant with phosphorus compounds, that have an excellent mechanical property spectrum, a good heat resistance, an improved flame-proofing effect and improved flow behavior (processing behavior).

SUMMARY OF THE INVENTION

Compositions containing:

I. at least two components selected from the group comprising aromatic poly(ester) carbonates, graft polymers of one or more vinyl monomers on one or more graft bases having a glass transition temperature of <10° C., a thermoplastic vinyl (co)polymer, or poly(alkylene terephthalate) as well as II. 0.5 to 25 parts by weight of a mixture of phosphorus compounds of the general formula (I)

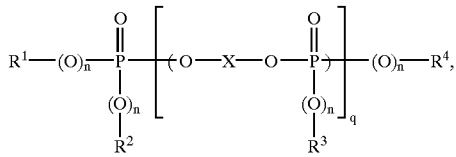

with the proviso that the composition contains at least 2 phosphorus compounds of the formula (I) in which X or one or more radicals $R^1$, $R^2$, $R^3$ and $R^4$ is/are different.

BACKGROUND OF THE INVENTION

U.S. Pat. No. 5,061,745 describes molding compositions of an aromatic polycarbonate, graft polymer and monophosphate. Although these mixtures exhibit a good flow behavior and a good flame-proofing effect, nevertheless they often do not have the required high degree of heat resistance. Moreover, on account of their volatility, monophosphates do not meet specific processing conditions for the formation of an effective coating.

In EP-A 0 640 655 molding compositions of aromatic polycarbonate, styrene-containing copolymers and graft polymers are described that may be rendered flame-resistant with monomeric and/or oligomeric phosphorus compounds. The aforementioned disadvantages may arise on account of the content of monomeric phosphorus compounds.

EP-A 747 424 describes the use of a combination of phosphate having a molecular weight of approximately 500 to 2,000 and phosphate having a molecular weight of approximately 2,300 to 11,000 as flame-proofing agent in thermoplastic resins, a large number of thermoplastic resins being listed. On account of the high molecular weight of the flame-proofing agents deficiencies in the flame-proofing effect can be expected.

In EP-A-0363608 flame-resistant polymer mixtures are described, consisting of aromatic polycarbonate, styrene-containing copolymer or graft copolymer as well as an oligomeric phosphate as flame-proofing additive, wherein frequently the required property combination of a good flame-proofing effect and good processing behavior is not achieved.

The object of the present invention is accordingly to provide polycarbonate compositions that have an improved flame-proofing effect, a high heat resistance, and improved flow behavior (processing behavior) as well as good mechanical properties.

It has now surprisingly been found that by the use of mixtures of oligophosphates with various structures, molding compositions/molded articles can be obtained that have the desired property profile.

DETAILED DESCRIPTION OF THE INVENTION

The present invention provides compositions containing:

I. at least two components selected from the group comprising aromatic poly(ester) carbonates, graft polymers of one or more vinyl monomers on one or more graft bases having a glass transition temperature of <10° C., and thermoplastic vinyl (co)polymer, as well as II. 0.5 to 25 parts by weight of a mixture of phosphorus compounds of the general formula (I)

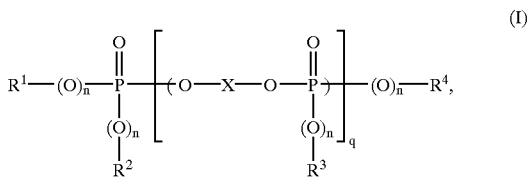

wherein

X denotes a mononuclear or polynuclear aromatic radical with 6 to 30 C atoms, $R^1$, $R^2$, $R^3$ and $R^4$ independently of one another denote optionally halogenated $C_1$–$C_8$ alkyl, or $C_5$–$C_6$ cycloalkyl, $C_6$–$C_{20}$ aryl or $C_7$–$C_{12}$ aralkyl in each case optionally substituted by halogen and/or $C_1$–$C_4$ alkyl, n independently of one another denotes 0 or 1, preferably 1, q denotes 0.5 to 30, with the proviso that the composition contains at least 2 phosphorus compounds of the formula (I) in which X or one or more radicals $R^1$, $R^2$, $R^3$ and $R^4$ are different and wherein the sum of the parts by weight of the components is 100.

The present invention preferably provides compositions containing:

A) 5 to 95 parts by weight, preferably 10 to 90 parts by weight, particularly preferably 20 to 80 parts by weight of aromatic polycarbonate and/or polyester carbonate B) 1 to 60 parts by weight, preferably 1 to 40 parts by weight, particularly preferably 2 to 30 parts by weight, of at least one graft polymer of
  B.1 5 to 95 wt. %, preferably 20 to 60 wt. % of one or more vinyl monomers on
  B.2 5 to 95 wt. %, preferably 40 to 80 wt. % of one or more graft bases having a glass transition temperature of <10° C., preferably 0° C., particularly preferably <–20° C., C) 0 to 50 parts by weight, preferably 1 to 30 parts by weight, particularly preferably 2 to 25 parts by weight of thermoplastic vinyl (co)polymer and/or thermoplastic poly(alkylene terephthalate)

D) 0.5 to 25 parts by weight, preferably 1 to 18 parts by weight, particularly preferably 2 to 15 parts by weight of a phosphorus compound of the general formula (I)

$$R^1-(O)_n-\overset{O}{\underset{\underset{R^2}{(O)_n}}{P}}-\left[-(O-X-O-\overset{O}{\underset{\underset{R^3}{(O)_n}}{P}})-\right]_q(O)_n-R^4, \quad (I)$$

wherein
X denotes a mononuclear or polynuclear aromatic radical with 6 to 30 C atoms,
$R^1$, $R^2$, $R^3$ and $R^4$ independently of one another denote optionally halogenated $C_1$–$C_8$ alkyl, or $C_5$–$C_6$ cycloalkyl, $C_6$–$C_{20}$ aryl or $C_7$–$C_{12}$ aralkyl in each case optionally substituted by halogen and/or $C_1$–$C_4$ alkyl,
n independently of one another denotes 0 or 1, preferably 1,
q denotes 1 to 30,
E) 0.05 to 5 parts by weight, preferably 0.1 to 1 part by weight, particularly preferably 0.1 to 0.5 part by weight of fluorinated polyolefin with the proviso that the composition contains at least 2 phosphorus compounds of the formula (I) in which X or one or more radicals $R^1$, $R^2$, $R^3$ and $R^4$ are different and wherein the sum of the parts by weight is 100.

Component A

Suitable aromatic polycarbonates and/or aromatic polyester carbonates of component A according to the invention are known in the literature or can be produced by methods known in the literature (for the production of aromatic polycarbonates see for example Schnell, "Chemistry and Physics of Polycarbonates", Interscience Publishers, 1964, as well as DE-AS 1 495 626, DE-OS 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates is carried out for example by reacting diphenols with carbonic acid halides, preferably phosgene and/or with aromatic dicarboxylic acid dihalides, preferably benzenedicarboxylic acid dihalides, by the phase boundary process, optionally with the use of chain terminators, for example monophenols, and optionally with the use of trifunctional or more than trifunctional branching agents, for example triphenols or tetraphenols.

Diphenols for the production of the aromatic polycarbonates and/or aromatic polyester carbonates are preferably those of the formula (II)

$$HO-\underset{(B)_x}{\bigcirc}-[A^1-\underset{(B)_x}{\bigcirc}]_p-OH, \quad (II)$$

wherein
$A^1$ denotes a single bond, $C_1$–$C_5$ alkylene, $C_2$–$C_5$ alkylidene, $C_5$–$C_6$ cycloalkylidene, —O—, —SO—, —CO—, —S—, —SO$_2$—, $C_6$–$C_{12}$ arylene, which may be condensed with further aromatic rings optionally containing heteroatoms, or a radical of the formula $$-\underset{\underset{R^6}{|}}{\overset{\overset{1}{|}}{C}}\underset{(Z)_m}{\bigcirc}\underset{R^7}{|}- \quad (III)$$

or a radical of the formula (IV)

$$-\underset{\underset{CH_3}{|}}{\overset{\overset{CH_3}{|}}{C}}-\bigcirc-\underset{\underset{CH_3}{|}}{\overset{\overset{CH_3}{|}}{C}}- \quad IV$$

B independently of one another denotes $C_1$–$C_8$ alkyl, preferably $C_1$–$C_4$ alkyl, in particular methyl, halogen, preferably chlorine and/or bromine, $C_6$–$C_{10}$ aryl, preferably phenyl, $C_7$–$C_{12}$ aralkyl, phenyl-$C_1$–$C_4$-alkyl, preferably benzyl
x is in each case independently of one another 0, 1 or 2,
p is 1 or 0, and
$R^6$ and $R^7$ may be chosen individually for each Z, and independently of one another denote hydrogen or $C_1$–$C_6$ alkyl, preferably hydrogen, methyl and/or ethyl,
Z denotes carbon, and
m is an integer from 4 to 7, preferably 4 or 5,
with the proviso that on at least one atom Z $R^6$ and $R^7$ are both simultaneously alkyl.

Preferred diphenols are hydroquinone, resorcinol, 4,4'-dihydroxydiphenyl, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones, and α,α-bis-(hydroxyphenyl)-diisopropylbenzenes such as their nuclear-brominated and/or nuclear-chlorinated derivatives.

Particularly preferred diphenols are 4,4'-diphenylphenol, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethylcyclohexane, 4,4'-dihydroxydiphenyl sulfide, 4,4'-dihydroxydiphenyl sulfone as well as their dibrominated and tetrabrominated or chlorinated derivatives, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane.

2,2-bis-(4-hydroxyphenyl)propane (bisphenol A) is particularly preferred.

The diphenols may be used individually or as arbitrary mixtures.

The diphenols are known in the literature or can be obtained by processes known in the literature.

Suitable chain terminators for the production of the thermoplastic, aromatic polycarbonates include for example phenol, p-chlorophenol, p-tert, -butylphenol or 2,4,6-tribromophenol, as well as long-chain alkylphenols such as 4-(1,3-tetramethylbutyl)phenol according to DE-OS 2 842 005, or monoalkylphenols or dialkylphenols with a total of 8 to 20 C atoms in the alkyl substituents, such as 3,5-di-tert.-butylphenol, p-iso-octylphenol, p-tert.-octylphenol, p-dodecylphenol, and 2-(3,5-dimethylheptyl)phenol and 4-(3,5-dimethylheptyl)phenol. The amount of chain terminators used is generally between 0.5 mole % and 10 mole %, referred to the molar sum of the diphenols used in each case.

The thermoplastic aromatic polycarbonates have mean, weight average molecular weights ($M_w$, measured for example by ultracentrifugation or light-scattering measurements) of 10,000 to 200,000, preferably 20,000 to 80,000.

The thermoplastic, aromatic polycarbonates may be branched in a known manner, and more specifically preferably by the incorporation of 0.05 to 2.0 mole %, referred to the sum of the diphenols used, of compounds having 3 or more functionalities, for example those with three or more than three phenolic groups.

Also suitable are homopolycarbonates as well as copolycarbonates. For the production of copolycarbonates according to the invention, as component A there may also be used 1 to 25 wt. %, preferably 2.5 to 25 wt. % (referred to the total amount of diphenols used) of polydiorganosiloxanes with hydroxy-aryloxy terminal groups. These are known (see for example U.S. Pat. No. 3,419,634) or can be produced by methods known in the literature. The production of polydiorganosiloxane-containing copolycarbonates is described for example in DE-OS 3 334 782.

Preferred polycarbonates include, in addition to bisphenol A homopolycarbonates, also the copolycarbonates of bisphenol A with up to 15 mole %, referred to the molar sums of diphenols, of diphenols other than preferred and/or particularly preferred diphenols, especially up to 15 mole % of 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a ratio of between 1:20 and 20:1.

In the production of polyester carbonates a carbonic acid halide, preferably phosgene, is in addition co-used as bifunctional acid derivative.

Suitable chain terminators for the production of the aromatic polyester carbonates include, apart from the already mentioned monophenols, also their chlorinated carbonic acid esters as well as the acid chlorides of aromatic monocarboxylic acids, which may optionally be substituted by $C_1$–$C_{22}$ alkyl groups or by halogen atoms, as well as aliphatic $C_2$–$C_{22}$ monocarboxylic acid chlorides.

The amount of chain terminators is in each case 0.1 to 10 mole %, referred in the case of phenolic chain terminators to moles of diphenols, and in the case of monocarboxylic acid chloride chain terminators to moles of dicarboxylic acid dichlorides.

The aromatic polyester carbonates may also include incorporated aromatic hydroxycarboxylic acids.

The aromatic polyester carbonates may be linear as well as branched in a known manner (see in this connection also DE-OS 2 940 024 and DE-OS 3 007 934).

As branching agents there may be used for example trifunctional or polyfunctional carboxylic acid chlorides such as trimesic acid trichloride, cyanuric acid trichloride, 3,3'-4,4'-benzophenone tetracarboxylic acid tetrachloride, 1,4,5,8-naphthalene-tetracarboxylic acid tetrachloride or pyromellitic acid tetrachloride in amounts of 0.01 to 1.0 mole % (referred to the dicarboxylic acid dichlorides that are used), or trifunctional or polyfunctional phenols such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)-propane, tetra-(4-[4-hydroxyphenylisopropyl]-phenoxy)-methane, 1,4-bis-[4,4'-dihydroxytriphenyl)-methyl]-benzene, in amounts of 0.01 to 1.0 mole %, referred to the diphenols that are used. Phenolic branching agents may be added together with the diphenols, while acid chloride branching agents may be added together with the acid dichlorides.

In the thermoplastic, aromatic polyester carbonates the proportion of carbonate structural units may be varied as desired.

Preferably the proportion of carbonate groups is up to 100 mole %, in particular up to 80 mole %, particularly preferably up to 50 mole %, referred to the sum total of ester groups and carbonate groups.

The ester fraction as well as the carbonate fraction of the aromatic polyester carbonates may be present in the form of blocks or may be statistically distributed in the polycondensate.

The relative solution viscosity ($\eta_{rel.}$) of the aromatic polyester carbonates is in the range 1:18 to 1.4, preferably 1.22 to 1.3 (measured in solutions containing 0.5 g of polyester carbonate in 100 ml of methylene chloride solution at 25° C.).

The thermoplastic, aromatic polycarbonates and polyester carbonates may be used alone or in arbitrary mixtures with one another.

Component B

Graft polymers constitute the component B according to the invention. These polymers include graft copolymers with rubber-elastic properties that may be obtained from at least 2 of the following monomers: chloroprene, butadiene-1,3, isoprene, styrene, acrylonitrile, ethylene, propylene, vinyl acetate and (meth)acrylic acid esters with 1 to 18 C atoms in the alcohol component; i.e. polymers such as are described for example in "Methoden der Organischen Chemie" (Houben-Weyl), Vol. 14/1, Georg Thieme-Verlag, Stuttgart 1961, pp. 393–406, and in C. B. Bucknall, "Toughened Plastics", Appl. Science Publishers, London 1977. Preferred polymers B are partially crosslinked and have gel contents of over 20 wt. %, preferably over 40 wt. %, in particular over 60 wt. %.

Preferred graft polymers B comprise graft polymers of:
B.1 5 to 95 parts by weight, preferably 30 to 80 parts by weight, of a mixture of
  B.1.1 50 to 99 parts by weight of styrene, α-methylstyrene, halogen-nuclear-substituted or methyl-nuclear-substituted styrenes, methyl methacrylate or mixtures of these compounds, and
  B.1.2 1 to 50 parts by weight of acrylonitrile, methacrylonitrile, methyl methacrylate, maleic anhydride, $C_1$–$C_4$ alkyl-substituted and/or N-phenyl-substituted maleimides or mixtures of these compounds on
B.2 5 to 95 parts by weight, preferably 20 to 70 parts by weight, of a polymer based on diene and/or alkyl acrylate and having a glass transition temperature of below −10° C., wherein the amounts of B.1 and B.2 refer to 100 parts by weight of B, and the amounts of B.1.1 and B.1.2 refer to 100 parts by weight of B.1.

Preferred graft polymers B are for example bases B.2 such as polybutadienes, polyisoprenes, butadiene/styrene or butadiene/acrylonitrile copolymers and acrylate rubbers grafted with styrene and/or acrylonitrile and/or (meth) acrylic acid alkyl esters; i.e. copolymers of the type described in DE-A 1 694 173 (=U.S. Pat. No. 3,564,077); polybutadienes, butadiene/styrene or butadiene/acrylonitrile copolymers, polyisobutenes or polyisoprenes grafted with acrylic or methacrylic acid alkyl esters, vinyl acetate, acrylonitrile, styrene and/or alkylstyrenes, such as are described for example in DE-A 2 348 377 (=U.S. Pat. No. 3,919,353). Particularly preferred graft bases are polybutadienes that may contain up to 50 wt. %, preferably up to 30 wt. % of other monomers selected from the group comprising styrene, acrylonitrile or acrylic or methacrylic acid $C_1$–$C_4$ alkyl esters or mixtures thereof.

Particularly preferred polymer B are for example ABS polymers, such as are described for example in DE-A 2 035 390 (=U.S. Pat. No. 3,644,574) or in DE-A 2 248 242 (=GB-A 1 409 275).

Further particularly preferred graft polymer B may be obtained by grafting

α 10 to 70 wt. %, preferably 15 to 50 wt. %, in particular 20 to 40 wt. %, relative to the weight of graft polymer B, of at least one (meth)acrylic acid ester or 10 to 70 wt. %, preferably 15 to 50 wt. %, in particular 20 to 40 wt. % of a mixture of 10 to 50 wt. %, preferably 20 to 35 wt. %, relative to the weight of the mixture, of acrylonitrile or (meth)acrylic acid esters and 50 to 90 wt. %, preferably 65 to 80 wt. %, relative to the weight of the mixture, of styrene, as graft base B.1 on β 30 to 90 wt. %, preferably 50 to 85 wt. %, in particular 60 to 80 wt. %, relative to the weight of the graft polymer B, of a butadiene polymer containing at least 50 wt. %, relative to the weight of β, of butadiene radicals as graft base B.2.

The gel content of the graft base β is in general at least 20 wt. %, preferably 40 wt. % (measured in toluene), the degree of grafting G is 0.15 to 0.55, and the mean particle diameter $d_{50}$ of the graft polymer B.2 is 0.05 to 2 μm, preferably 0.1 to 0.6 μm.

(Meth)acrylic acid esters α are esters of acrylic acid or methacrylic acid with monohydric alcohols containing 1 to 18 C atoms. Particularly preferred are methyl methacrylate, ethyl methacrylate and propyl methacrylate, n-butyl acrylate, t-butyl acrylate and t-butyl methylacrylate.

The graft base β may contain, in addition to butadiene radicals, also up to 50 wt. %, relative to the weight of β, of radicals of other ethylenically unsaturated monomers such as styrene, acrylonitrile, esters of acrylic acid or methacrylic acid with 1 to 4 C atoms in the alcohol component (such as methyl acrylate, ethyl acrylate, methyl methacrylate, ethyl methacrylate), vinyl esters and/or vinyl ethers. The preferred graft base β consists of pure polybutadiene.

The degree of grafting G denotes the weight ratio of grafted-on graft monomers to the graft base and is dimensionless.

The mean particle diameter $d_{50}$ is the diameter above and below which in each case 50 wt. % of the particles lie, and may be determined by means of ultracentrifuge measurements (W. Scholtan, H. Lange, Kolloid, Z. and Z. Polymere 250 (1972), 782–796).

Particularly preferred polymer B are for example also graft polymers of

τ. 20 to 90 wt. %, relative to the weight of component B, of acrylate rubber having a glass transition temperature of <–20° C. as graft base B.2 and δ 10 to 80 wt. %, relative to the weight of component B, of at least one polymerizable, ethylenically unsaturated monomer as graft monomer B.1.

The acrylate rubbers τ of the polymers B are preferably polymers of acrylic acid alkyl esters, optionally with up to 40 wt. %, relative to the weight of τ, of other polymerizable, ethylenically unsaturated monomers. The preferred polymerizable acrylic acid esters include $C_1$–$C_8$ alkyl esters, for example methyl, ethyl, butyl, n-octyl and 2-ethylhexyl esters; halogenated alkyl esters, preferably halogenated-$C_1$–$C_8$-alkyl esters such as chloroethyl acrylate, as well as mixtures of these monomers.

Monomers with more than one polymerizable double bond may be co-polymerized for the crosslinking. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as for example ethylene glycol dimethacrylate, allyl methacrylate; multiply unsaturated heterocyclic compounds, such as for example trivinyl cyanurate and triallyl cyanurate; polyfunctional vinyl compounds such as divinylbenzenes and trivinylbenzenes; as well as triallyl phosphate and diallyl phthalate.

Monomers that are preferably crosslinking include allyl methacrylate, ethylene glycol dimethacrylate, diallyl phthalate and heterocyclic compounds that contain at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine, and triallylbenzenes.

The amount of the crosslinking monomers is preferably 0.02 to 5 wt. %, in particular 0.05 to 2 wt. %, relative to the weight of graft base τ.

In the case of cyclic crosslinking monomers containing at least 3 ethylenically unsaturated groups, it is advantageous to restrict the amount to below 1 wt. % of the graft base τ.

Preferably "other" polymerizable ethylenically unsaturated monomers that in addition to the acrylic acid esters may optionally serve for the production of the graft base τ include for example acrylonitrile, styrene, α-methylstyrene, acrylamides, vinyl $C_1$–$C_6$ alkyl ethers, methyl methacrylate, and butadiene. Preferred acrylate rubbers as graft base τ are emulsion polymers that have a gel content of at least 60 wt. %.

Further suitable graft bases according to B.2 are silicone rubbers with graft-active sites, such as are described in DE-A 3 704 657, DE-A 3 704 655, DE-A 3 631 540 and DE-A 3 631 539.

The gel content of the graft base B.2 is measured at 25° C. in dimethylformamide (M. Hoffmann, H. Krömer, R. Kuhn, Polymeranalysis I and II, Georg Thieme-Verlag, Stuttgart 1977).

The graft polymers B may be produced according to known methods such as bulk, suspension, emulsion or bulk-suspension methods.

Since in the graft reaction the graft monomers are, as is known, not necessarily completely grafted onto the graft base, according to the invention the term graft polymers B is understood to mean only those products that are obtained by polyreaction of the graft monomers on the graft base.

The mean particle diameter $d_{50}$ is the diameter above and below which in each case 50 wt. % of the particles lie, and may be determined by means of ultracentrifuge measurements (W. Scholtan, H. Lange, Kolloid, Z. and Z. Polymere 250 (1972), 782–796).

Component C

The component C comprises one or more thermoplastic vinyl (co)polymers C.1 and/or polyalkylene terephthalates C.2.

Suitable as vinyl (co)polymers C.1 are polymers of at least one monomer from the group comprising vinyl aromatic compounds, vinyl cyanides (unsaturated nitriles), (meth)acrylic acid ($C_1$–$C_8$) alkyl esters, unsaturated carboxylic acids as well as derivatives (such as anhydrides and imides) of unsaturated carboxylic acids. Particularly suitable are (co)polymers of C.1.1 50 to 99 parts by weight, preferably 60 to 80 parts by weight of vinyl aromatic compounds and/or nuclear-substituted vinyl aromatic compounds (such as for example styrene, β-methylstyrene, p-methylstyrene, p-chlorostyrene) and/or methacrylic acid ($C_1$–$C_8$) alkyl esters (such as for example methyl methacrylate, ethyl methacrylate), and C.1.2 1 to 50 parts by weight, preferably 20 to 40 parts by weight of vinyl cyanides (unsaturated nitriles) such as acrylonitrile and methacrylonitrile and/or (meth)acrylic acid ($C_1$–$C_8$) alkyl esters (such as for example methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers C.1 are resin-like, thermoplastic and rubber-free.

Particularly preferred is the copolymer of C.1.1 styrene and C.1.2 acrylonitrile, wherein the parts by weight relate to 100 parts by weight of C.1.

The (co)polymers according to C.1 are known and may be produced by free-radical polymerisation, in particular by emulsion, suspension, solution or bulk polymerisation. The (co)polymers preferably have molecular weights $\overline{M}_w$ (weight average, determined by light scattering or sedimentation) of between 15,000 and 200,000.

The polyalkylene terephthalates of the component C.2 are reaction products of aromatic dicarboxylic acids or their reactive derivatives, such as dimethyl esters or anhydrides, and aliphatic, cycloaliphatic or araliphatic diols as well as mixtures of these reaction products.

Preferred polyalkylene terephthalates contain at least 80 mole %, preferably at least 90 mole %, referred to the dicarboxylic acid component, of terephthalic acid radicals, and at least 80 mole %, preferably at least 90 mole %, referred to the diol component, of ethylene glycol radicals and/or butanediol-1,4 radicals.

The preferred polyalkylene terephthalates may contain, in addition to terephthalic acid radicals, also up to 20 mole %, preferably up to 10 mole %, of radicals of other aromatic or cycloaliphatic dicarboxylic acids with 8 to 14 C atoms or aliphatic dicarboxylic acids with 4 to 12 C atoms, such as for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may contain, in addition to ethylene glycol radicals or butanediol-1,4 radicals, also up to 20 mole %, preferably up to 10 mole %, of other aliphatic diols with 3 to 12 C atoms or cycloaliphatic diols with 6 to 21 C atoms, for example radicals of propanediol-1,3,2-ethylpropanediol-1,3, neopentyl glycol, pentanediol-1,5, hexanediol-1,6, cyclohexanedimethanol-1,4,3-ethylpentanediol-2,4,2-methylpentanediol-2,4,2,2,4-trimethylpentanediol-1,3,2-ethylhexanediol-1,3,2,2-diethylpropanediol-1,3, hexanediol-2,5,1,4-di-(β-hydroxyethoxy)-benzene, 2,2-bis-(4-hydroxycyclohexyl)-propane, 2,4-dihydroxy-1,1,3,3-tetramethylcyclobutane, 2,2-bis-(4-β-hydroxyethoxyphenyl)-propane and 2,2-bis-(4-hydroxypropoxyphenyl)-propane (DE-OS 2 407 674, 2 407 776, 2 715 932).

The polyalkylene terephthalates may be branched by incorporating functional amounts of trihydric or tetrahydric alcohols or tribasic or tetrabasic carboxylic acids, for example according to DE-OS 1 900 270 and U.S. Pat. No. 3,692,744. Examples of preferred branching agents are trimesic acid, trimellitic acid, trimethylolethane and trimethylolpropane, and pentaerythritol.

Particularly preferred are polyalkylene terephthalates that have been produced simply from terephthalic acid and its reactive derivatives (for example its dialkyl esters) and ethylene glycol and/or butanediol-1,4, and mixtures of these polyalkylene terephthalates.

Mixtures of polyalkylene terephthalates contain 1 to 50 wt. %, preferably 1 to 30 wt. %, of polyethylene terephthalate, and 50 to 99 wt. %, preferably 70 to 99 wt. %, of polybutylene terephthalate.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in, for instance, an Ubbelohde viscosimeter.

The polyalkylene terephthalates may be produced by known methods (see for example Kunststoff-Handbuch, Vol. VIII, p. 695 ff, Carl-Hanser-Verlag, Munich 1973).

Component D

The molding compositions according to the invention contain as flame-proofing agent at least one phosphorus compound of the formula (I-a)

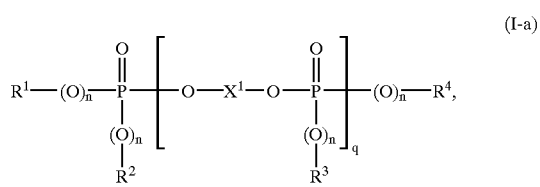

(I-a)

wherein the radicals $R^1$, $R^2$, $R^3$ and $R^4$, and n and q have the meanings mentioned above, $X^1$ denotes a mononuclear or polynuclear aromatic radical with 6 to 30 C atoms, and at least one phosphorus compound of the formula (I-b)

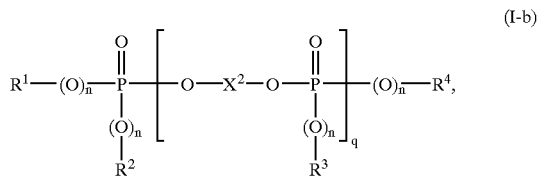

(I-b)

wherein the radicals $R^1$, $R^2$, $R^3$ and $R^4$, and n and q have the meanings mentioned above, and $X^2$ denotes a mononuclear or polynuclear aromatic radical with 6 to 30 C atoms, with the proviso that at least one of the radicals $X^1$, $X^2$, $R^1$, $R^2$, $R^3$ and $R^4$ in formula (Ia) is different from its counterpart in formula (Ib).

The aromatic groups in the definition of $R^1$, $R^2$, $R^3$ and $R^4$ may be substituted independently of one another by halogen and/or alkyl groups, preferably by chlorine, bromine and/or $C_1$–$C_4$ alkyl. Particularly preferred aryl radicals are cresyl, phenyl, xylenyl, propylphenyl or butylphenyl, as well as the corresponding brominated and chlorinated derivatives thereof. q denotes values from 0.5 to 30, and preferably denotes an average value from 1 to 30, particularly preferably 1 to 20, especially 1 to 10. With mixtures of phosphorus compounds q may have the aforementioned average values. Monophosphorus compounds and/or oligomeric and/or polymeric phosphorus compounds may be contained in this mixture. In the case where q=0, the formula (I) describes monophosphorus compounds.

$X^1$ and $X^2$ are in each case preferably different and denote a mononuclear or polynuclear aromatic radical with 6 to 30 C atoms. Preferred radicals are derived from diphenols according to formula (II).

Preferred diphenols are hydroquinone, resorcinol, 4,4'-dihydroxydiphenyl, bis-(hydroxyphenyl)-$C_1$-$C_5$-alkanes, bis-(hydroxyphenyl)-$C_5$-$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones, and α,α-bis-(hydroxyphenyl)-diisopropylbenzenes such as their nuclear-brominated and/or nuclear-chlorinated derivatives.

Particularly preferred diphenols are 4,4'-diphenylphenol, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethylcyclohexane, 4,4'-dihydroxydiphenyl sulfide, 4,4'-dihydroxydiphenyl sulfone as well as their dibrominated and tetrabrominated or chlorinated derivatives, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane.

Especially preferred diphenols are bisphenol A, resorcinol, hydroquinone, dihydroxydiphenyl, and dihydroxydiphenyl sulfone.

Mixtures of phosphorus compounds of the formula (I), preferably monomeric and/or oligomeric phosphates of the formula (I), with average q values of 1 to 20, in particular 1 to 10, are particularly preferably used as component D.

Suitable as monophosphorus compounds, i.e. where q=0, are compounds such as tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl)-phosphate, halogen-substituted aryl phosphates, methylphosphonic acid dimethyl ester, methylphosphonic acid diphenyl ester, phenylphosphonic acid diethyl ester, triphenylphosphine oxide or tricresylphosphine oxide.

The molding compositions according to the invention preferably contain as flame-proofing agent at least one phosphorus compound according to formula (I-c), (I-c)

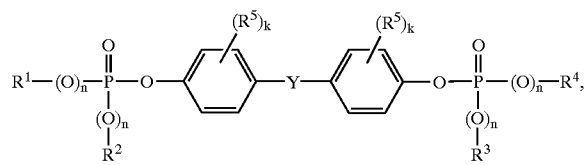

in which $R^1$, $R^2$, $R^3$, $R^4$, n and q have the meanings mentioned above. $R^5$ independently denotes $C_1$-$C_4$ alkyl and/or halogen, k denotes 0, 1 or 2, preferably 0, and Y denotes methylene or isopropylidene.

Particularly preferably Y denotes an isopropylidene radical.

The phosphorus compounds according to component D are generally known compounds of organic chemistry and may be produced in a similar way according to known methods (see for example Ullmanns Encyklopädie der Technischen Chemie, Vol. 18, p. 301 ff. 179; Houben-Weyl, Methoden der Organischen Chemie, Vol. 12/1, p. 43; Beistein, Vol. 6, p. 177) by using at least 2 different dihydroxy compounds, for example bisphenols or hydroquinone, for the synthesis.

Component E

The fluorinated polyolefins E are high molecular weight compounds and have glass transition temperatures of above −30° C., as a rule above 100° C., fluorine contents preferably of 65 to 76 wt. %, in particular 70 to 76 wt. %, and mean particle diameters $d_{50}$ of 0.05 to 1,000 μm, preferably 0.08 to 20 μm. In general the fluorinated polyolefins E have a density of 1.2 to 2.3 g/cm³. Preferred fluorinated polyolefins E are polytetrafluoroethylene, polyvinylidene fluoride, tetrafluoroethylene/hexa-fluoropropylene and ethylene/tetrafluoroethylene copolymers. The fluorinated polyolefins are known (see "Vinyl and Related Polymers" by Schildknecht, John Wiley & Sons, Inc., New York, 1962, pp. 484–494; "Fluorpolymers" by Wall, Wiley-Interscience, John Wiley & Sons, Inc., New York, Vol. 13, 1970, pp. 623–654; "Modern Plastics Encyclopedia", 1970–1971, Vol. 47, No. 10 A, October 1970, McGraw-Hill Inc., New York, pp. 134 and 774; "Modern Plastics Encyclopedia", 1975–1976, October 1975, Vol. 52, No. 10 A, McGraw-Hill Inc., New York, pp. 27, 28 and 472 and U.S. Pat. Nos. 3,671,487, 3,723,373 and 3,838,092) all incorporated herein by reference.

The polyolefins E may be produced according to known processes, for example by polymerising tetrafluoroethylene in an aqueous medium using a free radical-forming catalyst, for example sodium, potassium or ammonium peroxydisulfate at pressures from 7 to 71 kg/cm³ and at temperatures from 0° to 200° C., preferably at temperatures from 20° to 100° C. (For further details see for example U.S. Pat. No. 2,393,967.) Depending on the end use the density of these materials may be between 1.2 and 2.3 g/cm³, the mean particle size being between 0.5 and 1,000 μm.

According to the invention preferred fluorinated polyolefins E are tetrafluoroethylene polymers having mean particle diameters of 0.05 to 20 μm, preferably 0.08 to 10 μm, and a density of 1.2 to 1.9 g/cm³, and are preferably used in the form of a coagulated mixture of emulsions of the tetrafluoroethylene polymers E with emulsion of the graft polymers B.

Suitable fluorinated polyolefins E that may be used in powder form are tetrafluoroethylene polymers having mean particle diameters of 100 to 1,000 μm and densities of 2.0 g/cm³ to 2.3 g/cm³.

In order to produce a coagulated mixture of B and E, an aqueous emulsion (latex) of a graft polymer B is first of all mixed with a finely particulate emulsion of a fluorinated polyolefin E; suitable emulsions of fluorinated polyolefins usually have solids contents of 30 to 70 wt. %, in particular of 50 to 60 wt. %, preferably of 30 to 35 wt. %.

The quantitative details given in the description of the component B do not include the proportion of the graft polymer for the coagulated mixture of graft polymer and fluorinated polyolefins.

In the emulsion mixture the equilibrium ratio of graft polymer B to the fluorinated polyolefin E is 95:5 to 60:40. The emulsion mixture is coagulated in a known manner, for example by spray drying, freeze drying or coagulation by adding inorganic or organic salts, acids, bases or organic solvents miscible with water, such as alcohols, ketones, preferably at temperatures from 20° to 150° C., in particular from 50° to 100° C. If necessary the drying can be carried out at 50° to 200° C., preferably 70° to 100° C.

Suitable tetrafluoroethylene polymer emulsions are commercially available products and are marketed for example by DuPont as Teflon, for instance Teflon 30 N.

The compositions according to the invention may contain at least one of the conventional additives such as lubricants and mould release agents, nucleating agents, antistatics, stabilisers as well as colouring agents, pigments and/or reinforcing materials. Suitable inorganic reinforcing materials include glass fibres, optionally chopped or ground, glass beads, glass spheres, and reinforcing materials such as kaolin, talcum, mica and carbon fibres. Chopped or ground glass fibres preferably having a length of 1 to 10 mm and a diameter of <20 μm are preferably used as reinforcing materials in an amount of 1 to 40 parts by weight; the glass fibres are preferably surface treated.

The compositions according to the invention may furthermore contain at least one polar compound of at least one of the metals of main groups I to V or of subgroups I to VIII of the Periodic System together with at least one element selected from the group comprising oxygen, sulfur, boron, carbon, phosphorus, nitrogen, hydrogen and silicon in the form of a very finely divided inorganic powder. An oxide or hydroxide is preferably used as polar compound, preferably $TiO_2$, $SiO_2$, $SnO_2$, $ZnO$, boehmite, $ZrO_2$, $Al_2O_3$, iron oxides, their mixtures and doped compounds, particularly preferably boehmite or $TiO_2$.

The compositions according to the invention may contain one or more further, optionally synergistically acting flame-proofing agents. As further flame-proofing agents of component D there may be mentioned by way of example various phosphorus compounds, organic halogenated compounds such as decabromobisphenyl ether, tetrabromobisphenol, inorganic halogenated compounds such as ammonium bromide, nitrogen compounds such as melamine, melamine-formaldehyde resins, inorganic hydroxide compounds such as Mg hydroxide, Al hydroxide, inorganic compounds such as antimony oxides, barium metaborate, hexahydroxoantimonate, zirconium oxide, zirconium hydroxide, molybdenum oxide, ammonium molybdate, zinc borate, ammonium borate and tin oxide, as well as siloxane compounds. These flame-proofing agents are generally added in an amount of up to 20 wt. % (referred to the overall molding composition).

The compositions according to the invention containing the components A to E and optionally further known additives such as stabilizers, coloring agents, pigments, lubricants and mold release agents, nucleating agents, nanoparticles as well as antistatics and reinforcing materials and flame-proofing agents are produced by mixing the respective constituents in a known manner and melt-compounding and melt-extruding the mixture at temperatures from 200° C. to 300° C. in conventional equipment such as internal kneaders, extruders and double-shaft screw extruders, the component E preferably being used in the form of the previously mentioned coagulated mixture.

The mixing of the individual constituents may be carried out in a known manner either successively or also simultaneously, and more specifically at about 20° C. (room temperature) as well as at higher temperatures.

The compositions of the present invention may be used for the production of all types of molded articles. In particular molded articles may be produced by injection molding. Examples of molded articles that may be produced include all types of housing parts, e.g. for domestic appliances such as juice presses, coffee-making machines, mixers, for office equipment such as monitors, printers, copiers, or cover sheets for the building sector and parts for the automobile sector. The compositions are also used in the field of electrical engineering since they have very good electrical properties.

In addition the compositions according to the invention may be used for example to produce the following molded articles or molded parts:

internal structural parts for tracked vehicles (FR), wheelcaps, housings for electrical equipment containing small transformers, housings for equipment for information distribution and transmission, housings and covers for medical purposes, massage equipment and housings therefor, children's toys, two-dimensional wall elements, housings for safety equipment, rear spoilers, thermally insulated transporting containers, containers for the holding or maintenance of small animals, molded parts for sanitary ware and bath fittings, cover gratings for ventilation openings, molded parts for garden sheds and equipment housings, housings for garden tools.

Further possible applications include:

in data processing equipment: telecommunications equipment such as telephones and fax machines, computers, printers, scanners, plotters, monitors, keyboards, typewriters, dictating equipment, etc., in electrical equipment: power supply equipment, charging devices, small transformers for computers and consumer electronics equipment, low voltage transformers, etc., in garden equipment: garden furniture, lawnmower housings, hoses and housings for watering devices, garden sheds, hedge trimmers, cutters, shears, spraying equipment, etc., in the furniture sector: work surfaces, furniture laminates, roller shutter units, office furniture, tables, chairs, seats, cupboards, shelves, door units, window units, underbed storage drawers, etc., in sports equipment/toys: toy vehicles, seats, pedals, sports equipment, bicycles, tables tennis tables, home gyms, golf caddies, snow boards, external parts of boats, camping equipment, picnic baskets, etc., for internal/external use in the building sector: house cladding/lining, profiled strips, pipework, cabling, roller shutter parts, letterboxes, lamp housings, roof tiles, paving tiles, partition walls, cable ducting, skirting boards, electrical sockets, etc., in the automobile/tracked vehicle sector: sidewall and roof linings, seat frames, seats, benches, tables, luggage racks, wheelcaps, rear spoilers, mudguards, rear flaps, engine bonnets, side parts, etc.

The compositions are particularly suitable for the production of molded parts in which particularly high demands are placed on the thermal stability of the plastics that are used.

A further processing variant is the production of molded articles by thermoforming previously fabricated sheets or films.

The present invention accordingly also provides for the use of the compositions according to the invention for the production of all types of molded articles, preferably those mentioned above, as well as the molded articles produced from the compositions according to the invention.

EXAMPLES

Component A.1

Linear polycarbonate based on bisphenol A having a relative solution viscosity of 1.272 measured in $CH_2Cl_2$ as solvent at 25° C. and in a concentration of 0.5 g/100 ml.

Component B.1

Graft polymer of 40 parts by weight of a copolymer of styrene and acrylonitrile in a ratio of 73:27 on 60 parts by weight of particulate crosslinked polybutadiene rubber (mean particle diameter $d_{50}=0.34\,\mu m$) produced by emulsion polymerisation.

Component B.2

Graft polymer of 84 parts by weight of a copolymer of styrene and acrylonitrile in a ratio of 73:27 on 16 parts by weight of crosslinked polybutadiene rubber produced by bulk polymerisation.

Component D.1

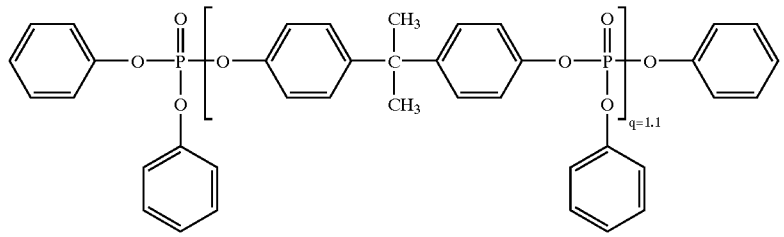

Reofos BAPP from Great Lakes Chem.

Component D.2 m-phenylene-bis(diphenyl phosphate), Fyrolflex® RDP from Akzo.

Component E.1

Tetrafluoroethylene polymer as coagulated mixture of an SAN graft polymer emulsion according to the aforementioned component B in water and a tetrafluoroethylene polymer emulsion in water. The weight ratio of graft polymer B to the tetrafluoroethylene polymer E in the mixture is 90 wt. % to 10 wt. %. The tetrafluoroethylene polymer emulsion has a solids content of 60 wt. %, and the mean particle diameter is between 0.05 and 0.5 $\mu m$. The SAN graft polymer emulsion has a solids content of 34 wt. % and a mean latex particle diameter of $d_{50}=0.28\,\mu m$.

The emulsion of the tetrafluoroethylene polymer (Teflon 30 N from DuPont) is mixed with the emulsion of the SAN graft polymer B and stabilised with 1.8 wt. %, referred to the polymer solids, of phenolic antioxidants. The mixture is coagulated at 85° to 95° C. with an aqueous solution of $MgSO_4$ (Epsom salts) and acetic acid at pH 4 to 5, filtered and washed until practically free of electrolytes, and is then freed from most of the water by centrifugation and finally dried at 100° C. to form a powder. This powder may then be compounded with the further components in the aforedescribed equipment.

Production and Testing of the Molding Compositions According to the Invention

The mixing of the components is carried out in a 3 l capacity internal kneader. The molded articles are produced in an Arburg 270 E type injection molding machine at 260° C.

The determination of the notch-impact strength $a_k$ is carried out according to ISO 180/1 A.

The flammability of the samples was measured according to UL-Subj. 94 V on rods of size 127×12.7×1.6 mm produced in an injection molding machine at 260° C.

The UL 94 V test is carried out as follows:

Substance samples are formed into rods of size 127×12.7×1.6 mm. The rods are mounted vertically so that the underneath of the sample body is 305 mm above a strip of bandage. Each sample rod is ignited individually by means of two successive ignition procedures of 10 seconds' duration, the combustion properties are observed after each ignition procedure, and the sample is then evaluated. To ignite the sample a Bunsen burner with a 100 mm (3.8 inch) high blue flame of natural gas with a thermal unit of $3.73 \times 10^4$ $kJ/m^3$ (1000 BTU per cubic foot) is used.

The UL 94 V-0 classification covers the following described properties of materials that are tested according to the UL 94 V instructions. The molding compositions in this class contain no samples that burn for longer than 10 seconds after each application of the test flame; they exhibit no overall flame time of more than 50 seconds in the second flame application on each sample; they contain no samples that burn completely up to the holding bracket secured to the upper end of the sample; they do not include any samples that ignite, due to burning droplets or particles, the bandage arranged underneath the sample; they also do not include any samples that glow for longer than 30 seconds after removal of the test flame.

Other UL 94 classifications designate samples that are less flame-resistant or less self-extinguishing, because they emit burning droplets or particles. These classifications are designated UL 94 V-1 and V-2. N.B. denotes "not resistant" and classifies samples that have a post-burning time of $\geq 30$ seconds.

The melt viscosity is determined according to DIN 54 811.

MVR is determined according to ISO 1133.

A summary of the properties of the molding compositions according to the invention is given in the following Table 1:

TABLE 1

| | Compositions and properties (Quantitative data in wt. %) | | | | |
|---|---|---|---|---|---|
| | 1(Comp.) | 2(Comp.) | 3 | 4 | 5 |
| A1 | 67.50 | 69.20 | 68.40 | 67.90 | 68.8 |
| B1 | 13.10 | 13.50 | 13.30 | 13.25 | 13.40 |
| B2 | 1.50 | 1.60 | 1.50 | 1.50 | 1.55 |
| D1 | 13.00 | 13 | 5.95 | 9.75 | 3.25 |
| D2 | — | 10.80 | 5.95 | 2.70 | 8.10 |
| E1 | 4.50 | 4.50 | 4.50 | 4.50 | 4.50 |
| Mould release agent | 0.40 | 0.40 | 0.40 | 0.40 | 0.40 |
| Phosphorus content | 1.16 | 1.16 | 1.16 | 1.16 | 1.16 |
| $a_k$ [$kJ/m^2$] ISO 180 1A | 45 | 45 | 45 | 45 | 45 |
| Vicat B 120 [° C.] | 98 | 97 | 99 | 99 | 98 |
| Overall burning time [sec.] (UL 94 V) | | | | | |
| 3.2 mm | 19 | 12 | 8 | 9 | 7 |
| 1.6 mm | 68 | 49 | 24 | 29 | 24 |
| Melt viscosities at 260° C., 1000 $s^{-1}$ [Pas] | 166 | 161 | 150 | 158 | 148 |
| MVR (240/5) [$cm^3$/10 min.] | 22.6 | 23.2 | 24.7 | 24.1 | 26.4 |

The molding compositions according to the invention contain a mixture of two structurally different oligophosphates and are characterised by a favourable property combination of high notch-impact strength, high thermal stability, good processing behavior and improved flame resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A molding composition comprising:
   I. at least two components selected from the group consisting of aromatic poly(ester) carbonates, graft polymers of one or more vinyl monomers on one or more graft bases having a glass transition temperature of <10° C., a thermoplastic vinyl (co)polymer or poly(alkylene terephthalate), and
   II. 0.5 to 25 parts by weight of a mixture of phosphorus compounds represented by the following formulas (I-a) and (I-b)

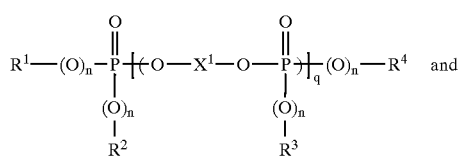
(I-a)

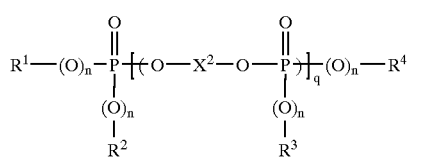
(I-b)

wherein independently for each of formulas (I-a and I-b)

$X^1$ and $X^2$ are each independently represented by the following formula (II),

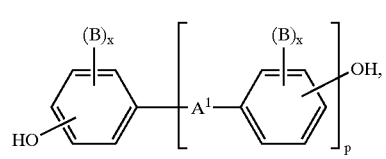
(II)

for which $A^1$ denotes a member selected from the group consisting of $C_1$–$C_3$ alkylene, $C_2$–$C_6$ alkylidene, $C_5$–$C_6$ cycloalkylidene, —O—, —SO—, —CO—, —S—, —SO—, $C_6$–$C_{12}$ arylene, each optionally condensed with further aromatic rings optionally containing heteroatoms, and a radical of the formula

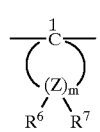
(III)

or a radical of the formula (IV)

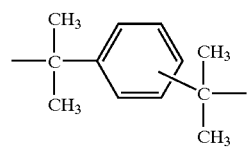
IV and where

B independently of one another denotes $C_1$–$C_6$ alkyl, $C_6$–$C_{10}$ aryl, $C_7$–$C_{12}$ aralkyl, x is in each case independently of one another 0, 1 or 2 p is 1 or 0, and $R^6$ and $R^7$ for each Z, independently of one another denote hydrogen or $C_1$–$C_8$ alkyl, Z denotes carbon, and m denotes an integer from 4 to 7, with the proviso that on at least one atom Z, $R^6$ and $R^7$ are simultaneously alkyl $R^1$, $R^2$, $R^3$ and $R^4$ independently of one another denote optionally halogenated $C_1$–$C_8$ alkyl or unsubstituted or substituted $C_5$–$C_6$ cycloalkyl, $C_6$–$C_{20}$ aryl or $C_7$–$C_{12}$ aralkyl where the substituents are selected from at least one of the group consisting of halogen and $C_1$–$C_4$ alkyl n independently of one another denotes 0 or 1, q denotes 0.5 to 30, with the proviso that said mixture of phosphorous compounds contains at least 1 phosphorus compounds represented by formula (I-a) and at least 1 phosphorus compounds represented by formula (I-b) and the phosphorous compounds of formulas (I-a) and (I-b) differ one from the other in at least one of their respective $X^1$, $X^2$, $R^1$, $R^2$, $R^3$ or $R^4$ groups, and wherein the sum of the parts by weight of the components is 100.

2. The composition of claim 1 wherein $X^1$ and $X^2$ are each independently derived from a member selected from the group consisting of bisphenol A, resorcinol, hydroquinone, and dihydroxydiphenyl sulfone.

3. The composition of claim 1 wherein the mixture of phosphorous compounds contains at least one phosphorus compound according to formula (I-c),

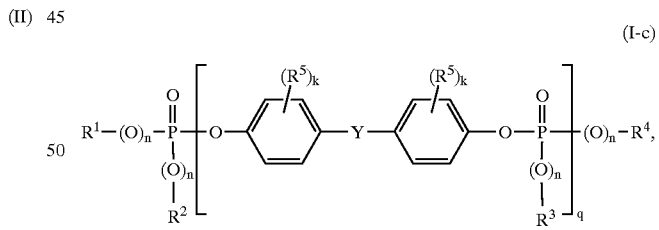
(I-c)

In which Y denotes an isopropylidene radical, $R^5$ independently denotes $C_1$–$C_4$ alkyl or halogen, and k denotes 0, 1 or 2.

4. The composition according to claim 1 wherein the graft copolymer is based on at least 2 monomers selected from the group consisting of chloroprene, butadiene-1,3, isoprene, styrene, acrylonitrile, ethylene, propylene, vinyl acetate and (meth)acrylic acid esters with 1 to 18 C atoms in the alcohol component.

5. The composition of claim 4 wherein the graft polymer is based on:
   B.1 5 to 95 parts by weight relative to 100 parts of the graft polymer of a mixture of B.1.1 50 to 99 parts by weight relative to 100 parts of B.1 of at least one member selected from the group consisting of styrene, α-methylstyrene, halogen-nuclear-substituted and methyl-nuclear-substituted styrenes and methyl methacrylate, and B.1.2 1 to 50 parts by weight relative to 100 parts of B.1 of at least one member selected from the group consisting of acrylonitrile, methacrylonitrile, methylmethacrylate, maleic anhydride, $C_1$–$C_4$ alkyl-substituted maleimide and N-phenyl-substituted maleimide, and B.2 5 to 95 parts by weight relative to 100 parts of B of polymer based on at least one member selected from the group consisting of diene and alkyl acrylate having a glass transition temperature of below –10° C.

6. The composition according to claim 5, wherein B.2 is a member selected from the group consisting of polybutadiene, polyisoprene, butadiene/styrene copolymer, butadiene/acrylonitrile copolymer and acrylate rubber.

7. The composition according to claims 1 wherein vinyl monomer is at least one member selected from the group consisting of vinyl aromatic compound, vinyl cyanide, (meth)acrylic acid-($C_1$–$C_8$)-alkyl ester, unsaturated carboxylic acid, and a derivative of an unsaturated carboxylic acid.

8. The composition according to claim 1 further comprising an anti-drip agent.

9. A molding composition comprising:

A) 5 to 95 parts by weight relative to 100 parts of the composition of at least one member selected from the group consisting of an aromatic polycarbonate and polyester carbonate, B) 1 to 60 parts by weight relative to 100 parts of the composition of at least one graft polymer of B.1 5 to 95 wt. % relative to the weight of B) of one or more vinyl monomers on B.2 5 to 95 wt. % relative to the weight of B) of one or more graft bases having a glass transition temperature of <10° C., C) 0 to 50 parts by weight relative to 100 parts of the composition of a member selected from the group consisting of a thermoplastic vinyl (co)polymer and thermoplastic poly(alkylene terephthalate)

D) 0.5 to 25 parts by weight relative to 100 parts of the composition of a mixture of phosphorus compounds represented by the following formulas (I-a) and (I-b)

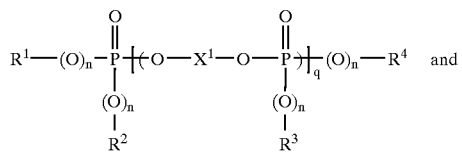

(I-a)

and

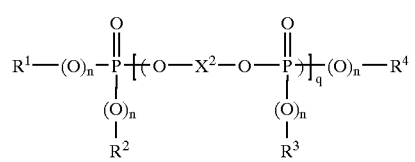

(I-b)

wherein independently for each of formulas (I-a) and (I-b), $X^1$ and $X^2$ are each independently represented by the following formula (II),

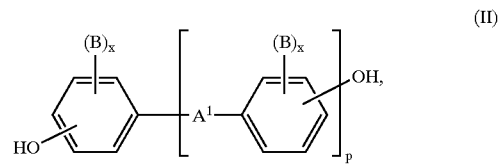

(II)

for which $A^1$ denotes a member selected from the group consisting of $C_1$–$C_2$ alkylene, $C_2$–$C_3$ alkylidene, $C_5$–$C_8$ cycloalkylidene, —O—, —SO—, —CO—, —S—, —$SO_2$—, $C_8$–$C_{12}$ arylene, each optionally condensed with further aromatic rings optionally containing heteroatoms, and a radical of the formula

(III)

or a radical of the formula (IV)

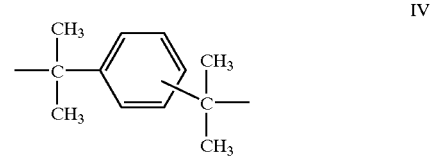

IV and where

B independently of one another denotes $C_1$–$C_8$ alkyl, $C_8$–$C_{10}$ aryl, $C_2$–$C_{12}$ aralkyl, x is in each case independently of one another 0, 1 or 2, p is 1 or 0, and $R^4$ and $R^7$ for each Z, independently of one another denote hydrogen or $C_1$–$C_6$ alkyl, Z denotes carbon, and m denotes an integer from 4 to 7, with the proviso that on at least one atom Z, $R^6$ and $R^7$ are simultaneously alkyl $R^1$, $R^2$, $R^3$ and $R^4$ independently of one another denote optionally halogenated $C_1$–$C_8$ alkyl or unsubstituted or substituted $C_5$–$C_6$ cycloalkyl, $C_6$–$C_{20}$ aryl or $C_7$–$C_{12}$ aralkyl where the substituents are selected from at least one of the group consisting of halogen and $C_1$–$C_4$ alkyl n independently of one another denotes 0 or 1, q denotes 1 to 30, and E) 0.05 to 5 parts by weight of anti-drip agent, with the proviso that the mixture of phosphorous compounds contains at least 1 phosphorus compounds represented by formula (I-a) and at least 1 phosphorous compound represented by formula (I-b), and the phosphorous compounds of formulas (I-a) and (I-b) differ one from the other in at least on of their respective $X^1$, $X^2$, $R^1$, $R^2$, $R^3$ and $R^4$ groups, and wherein the sum of the parts by weight is 100.

10. A method of using the composition of claim 1 comprising producing a molded article.

11. A molded article comprising the composition of claim 1.

12. The composition of claim 9 comprising a first phosphorous compound represented by formula (I-a) and a second phosphorous compound represented by formula (I-b), wherein, for said first phosphorous compound,
R¹, R², R³ and R⁴ are each phenyl,
n is 1,
q is 1.1, and
X¹ is represented by the following formula,

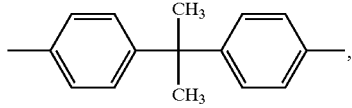

and p1 for said second phosphorous compound,
R¹, R², R³ and R⁴ are each phenyl,
n is 1,
q is 1, and
X² is represented by the following formula,

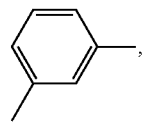

further wherein said composition has a weight ratio of said first phosphorous compound to said second phosphorous compound selected from 1.0:1.0, 3.8:1.0 and 0.40:1.0.

13. The composition of claim 9 wherein said composition consists of components A) through E).

* * * * *